3,591,397
IRON TRICARBONYL COMPLEXES OF ELEOSTEARIC ACID ESTERS AND COMPOSITIONS CONTAINING THEM
Michael Cais, Ahuza, Haifa, Israel, and Edwin N. Frankel, Peoria, Ill., assignors to the United States of America as represented by the Secretary of Agriculture
No Drawing. Filed July 25, 1968, Ser. No. 747,471
Claims priority, application Israel, Aug. 18, 1967, 28,524
Int. Cl. C07f 15/02; C09d 3/34; C11c 3/00
U.S. Cl. 106—264                6 Claims

ABSTRACT OF THE DISCLOSURE

The present invention concerns new iron tricarbonyl complexes of eleostearic acid esters and compositions containing them. The chemical bonds in the complexes with which the invention is concerned are of the $\pi$-electron type. In the following description and appended claims these $\pi$-bonded complexes will be referred to for short as "complexes."

---

A non-exclusive, irrevocable, royalty free license in the invention herein described, throughout the world for all purposes of the United States Government, with the power to grant sublicenses for such purposes, is hereby granted to the Government of the United States of America.

Eleostearic acid is a major component of tung oil, where it is present as glyceride. Tung oil is commonly employed as a drying oil for the formulation of paint, varnish and enamel compositions and it is one object of the present invention to improve the drying properties of tung oil.

It is a further object of the present invention to provide novel iron tricarbonyl complexes of various eleostearic acid esters as well as processes for their production and purification.

The novel iron tricarbonyl complexes of eleostearic acid provided in accordance with the present invention have various industrial applications. Thus, some may be used as additives to various drying oils such as tung oil for improving the drying properties thereof, and they may also themselves be used as drying oils. Some of them may furthermore be used as catalysts in various chemical reactions and also as antiknock agents. Also in some cases the conversion of eleostearic acid esters into their iron tricarbonyl complexes is useful for conservation and storage of these esters.

This invention consists in novel iron tricarbonyl complexes of eleostearic acid esters corresponding to the formula

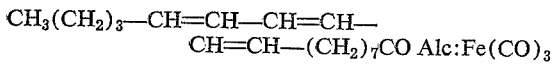
CH$_3$(CH$_2$)$_3$—CH=CH—CH=CH—
                CH=CH—(CH$_2$)$_7$CO Alc:Fe(CO)$_3$ in which Alc stands for the radical of an esterifying alcohol.

The radical Alc may be of a mono- or polyhydric alcohol and in the latter case the remaining hydroxyl groups may also be esterified by eleostearic acid or by other unsaturated or saturated acids.

Even though dieneiron tricarbonyl complexes have been known for some time, it was unexpected that eleostearic acid esters, which contain a conjugated triene in their structure and as such are known to be unstable and are very easily polymerized, will form iron tricarbonyl complexes which will be amenable to isolation and purification.

The novel complexes according to the invention are prepared by reacting an eleostearic acid ester with an iron carbonyl such as iron pentacarbonyl or diiron enneacarbonyl in an inert atmosphere, if desired in the presence of a solvent, and the resulting iron tricarbonyl complex is recovered from the reaction mixture. In this way a crude product is obtained which, if desired, may be purified, e.g., by liquid partition chromatography.

In accordance with one embodiment of the invention aimed at providing tung oil of improved drying properties, tung oil is used as the starting eleostearic acid ester. In accordance with this embodiment the complexation reaction may be carried on until substantially the entire eleostearic acid content of the starting material is complexed. Alternatively, it is also possible to effect only partial complexation depending on the drying and other properties desired for the final product.

The invention is illustrated by the following examples to which it is not limited. In the examples U.V. spectra were recorded on a Cary 14 automatic recording spectrophotometer in methanol and I.R. spectra were recorded on Perkin Elmer 237 spectrophotometer. Qualitative spectra were run in chloroform and quantitative spectra in the region of 2000 cm.$^{-1}$ in carbon tetrachloride. Gas-liquid chromatography analyses were carried out on a Packard Gas Chromatograph equipped with hydrogen detector under the following conditions:

15% diethylene glycol succinate on Chromosorb W (60/80) on 6' x ¼" glass column—

| Temperature: | Degrees |
|---|---|
| Column | 190 |
| Detector | 225 |
| Inlet | 240 |
| Outlet | 240 |

Flow rate of N$_2$: 50 ml./min.

The methyl eleostearate used was prepared by transesterification from tung oil. Iron pentacarbonyl and diiron enneacarbonyl are both commercially available materials.

EXAMPLE 1

Reaction between methyl $\beta$-eleostearate and iron pentacarbonyl 2.92 g. methyl $\beta$-eleostearate (0.01 M) and 4 g. Fe(CO)$_5$ (0.02 M) were refluxed in freshly purified di-n-butyl ether, under nitrogen and in the dark for 50 hrs. After 50 hrs. another 4 g. of Fe(CO)$_5$ were added and the reflux continued for another 20 hrs. Samples were taken during the reaction, the solvent was evaporated in vacuum (water pump), and complex content was checked by infra red spectrum.

| Time (hrs.): | Percent complex |
|---|---|
| 4 | 26 |
| 20 | 34 |
| 28 | 69 |
| 50 | 80 |

Addition of another 2 mole-equivalents of Fe(CO)$_5$:

| 70 | 77 |
|---|---|

At the end of the reaction the solvent was removed (water pump vacuum) and the dark residue was dissolved in light petroleum ether, washed with a solution of HCl (conc. HCl. diluted 2:1) till no more yellow color was extracted in the aqueous layer.

The organic layer was washed with water (till neutral) dried (MgSO$_4$) and the solvent removed. The residue (3.28 g.) was a yellow red oil.

Qualitative infrared spectrum of the crude product exhibited a very strong doublet at 2000 cm.$^{-1}$ of the terminal CO. The peak at 1008 cm.$^{-1}$, which is very strong in the starting material, was very low in the product and there appeared a new peak at 970 cm.$^{-1}$.

Quantitative infrared shows 93% of complex content in the oil.

U.V. spectrum of the crude oil gave the following absorption $\lambda_{max}^{m\mu}$ ($\epsilon$): 202 (32000); 245 (19500); 305 (4800)

EXAMPLE 2

Ferric chloride decomposition of the complex 100 mg. of the complex of Example 1 were treated with 20 ml. of a saturated solution of ferric chloride in ethanol, at room temperature in order to decompose the complex and liberate the organic moiety. Nitrogen was bubbled through the solution for 1 hr. After addition of water, the reaction mixture was extracted with light petroleum ether. The colorless organic layer, was washed with water, dried (MgSO$_4$) and the solvent evaporated to yield 70 mg. of colorless oil. Gas-liquid chromatography showed that the major component of this oil was metal-free methyleleostearate.

EXAMPLE 3

Reaction between methyl β-eleostearate and diiron enneacarbonyl 2.92 g. methyl β-eleostearate (0.01 M) and 7.28 g. Fe$_2$(CO)$_9$ (0.02 M) were refluxed in petroleum ether 60–80 for 20 hrs. Another amount of 7.28 g. Fe$_2$(CO)$_9$ was added and the reaction mixture was refluxed for another 28 hrs. Samples were taken during the reaction and complex content was checked by quantitative infrared spectrum.

| Time (hrs.): | Percent complex |
|---|---|
| 20 | 2.3 |
| 24 | 56.3 |
| 43 | 78.2 |
| 47 | 81.5 |

The reaction mixture was filtered (the green color of the filtrate came from traces of Fe$_3$(CO)$_{12}$, and the solvent was evaporated to yield 3.32 g. of crude oil which exhibited the same qualitative infrared spectrum as that obtained for the product of Example 1.

EXAMPLE 4

Purification of methyl β-eleostearate iron tricarbonyl by liquid partition chromatography About 300 mg. of crude complex (containing 50–60% complex) dissolved in equilibrated petroleum ether were chromatographed on a column prepared from 50 g. silica, which had been pretreated with 100 ml. light petroleum ether (equilibrated with acetonitrile) and 20 ml. of acetonitrile (equilibrated with petroleum ether). Elution with equilibrated petroleum ether yielded first a clear fraction followed by a green solution. Small fractions were collected and after evaporation checked for complex content. Infrared analysis showed the presence of about 80–95% complex. The chromatographed fractions were combined and rechromatographed on a column prepared as above.

From 510 mg. of once-chromatographed material (containing about 85% complex) the following fractions were collected:

| Fraction No.: | Color | Volume (ml.) | Weight (mg.) | Percent complex |
|---|---|---|---|---|
| 0 | Clear | 105 | 5 | |
| 1 | Light-green yellow. | 10 | 22.8 | |
| 2 | Yellow | 5 | 51.5 | 102 |
| 3 | do | 20 | 264.8 | |
| 4 | do | 10 | 72.0 | |
| 5 | do | 10 | 35.3 | |
| 6 | Light yellow | 15 | 20.0 | 87 |
| 7 | do | 15 | 6.0 | |
| 8 | Clear | 20 | 2.8 | |
| Total wt. collected | | | 480.2 | |

Fractions 3–5 were combined and all the analyses were made on this fraction.

*Elemental analyses.*— Calculated for C$_2$H$_{32}$O$_5$Fe (percent): C, 61.11; H, 7.44; O, 18.55; Fe, 12.91. Found (percent): C, 61.62; H, 7.48; O, 19.23; Fe, 11.69.

U.V. spectrum $\lambda_{max}$ ($\epsilon$): 202 (32.300); 245 (19.300); 305 (4830).

EXAMPLE 5

Stabilization experiments 200 mg. of methyl β-eleostearate and 200 mg. of methyl β-eleostearate-iron tricarbonyl, in separate flasks were kept in the dark, exposed to air. The free triene content was checked for its U.V. absorption maximum at 268 m$\mu$. The complex was checked by quantitative infrared spectrum for complex content. The results are summarized in Table 1.

TABLE 1

[Relative air-stabilities of β-eleostearate and its—Fe(CO)$^3$ complex]

| | Free ester, $\epsilon$ 268 m$\mu$ | Ester-Fe(CO)$^3$,* Percent of complex (from $\epsilon$ 2000 cm.$^{-1}$) |
|---|---|---|
| Time (hrs.): | | |
| 0 | 56,200 | 106 |
| 29 | 20,100 | 109 |
| 53 | 11,900 | 103 |
| 173 | No defined peak | |

*The infrared analysis has been found to be, in general, accurate to within ±5%.

The above data indicate that the air-sensitive methyl β-eleostearate can be stabilized to a large extent by formation of an iron tricarbonyl complex.

EXAMPLE 6

Preparation of tung oil complex by reaction with iron pentacarbonyl in a solvent The reaction was carried out by following the procedure of Example 1 and the results are given in the following Table 2:

TABLE 2

[Preparation of Fe(CO)$_3$ complexes from tung oil]

| Run | 1 [1,2] | 2 [3] | 3 [4] |
|---|---|---|---|
| Number of equivalents of tung oil | 0.275 | 0.03 | 0.03 |
| Number of equivalents of Fe(CO)$_5$ | 1.1 | 0.12 | 0.12 |
| Mls. of solvent (di-n-butyl ether) | 150 | 100 | 100 |
| Reaction temperature (°C.) | 135–140 | 145–170 | 140–160 |
| Time of reaction (hrs.) | 45 | 26 | 14 |
| Percent yield of complex | 52.0 | 83.7 | 89.6 |

[1] Percent complex formation after 24 hrs.—28%.
[2] Mechanical stirring was used during the reaction.
[3] Percent complex formation after 21 hrs.—78.5%.
[4] Percent complex formation after: 2 hrs.—17.9%; 4 hrs.—34.5%; 6.5 hrs.—50.2%; 9.5 hrs.—70.5%; 11.5 hrs.—78.8%.

EXAMPLE 7

Preparation of tung oil complex by reaction with iron pentacarbonyl without solvent 60 g. (0.2 equivalent) of tung oil and 105 ml. (0.8 equivalent) of Fe(CO)$_5$ were heated in a three-necked, 500 ml. round-bottomed flask equipped with two condensers, with good cooling and a mechanical stirrer. The mixture was deaerated by gentle nitrogen bubbling. The outside temperature was maintained at 130°–135° for 36 hrs. The reaction was followed by sequential analysis by infrared for percentage of complex present.

| Time (hrs.): | Percent complex |
|---|---|
| 24 | 26.6 |
| 36 | 30 |

The reaction mixture was cooled to room temperature and transferred with light petroleum ether into a separating funnel. The mixture was treated repeatedly with dilute HCl (2:1) until the washings were clear. The oil solution was then washed with water to neutrality and dried over MgSO$_4$. After removal of solvent, the complexed product was yellow-red. Infrared analysis for percentage of complex content was found to be 38.8%.

EXAMPLE 8

Preparation of tung oil complex by reaction with iron pentacarbonyl in an autoclave 100 g. (0.275 equivalent) of tung oil was charged into a 300 ml. autoclave together with 89.4 ml. (0.55 equivalent) of Fe(CO)$_5$. The autocalve used was equipped with mechanical stirrer and water-cooling system. The sealed autoclave was purged four times with nitrogen at a pressure 500 p.s.i. with stirring. After releasing the pressure, the autoclave was again charged with 70 p.s.i. nitrogen before heating. The reaction mixture was heated to 187° C. The pressure in the system reached a maximum of 740 p.s.i. after 2 hours. After cooling the autoclave the pressure was released to 100 p.s.i. The system was reheated to 186–188° for additional 3 hrs. and reached a maximum off 550 p.s.i.

The autoclave was cooled to room temperature. The reaction mixture was transferred with benzene into a round-bottom flask, and the benzene and unreacted Fe(CO)$_5$ were evaporated under vacuum (water pump). The dark oil was redissolved in light petroleum ether and worked up by the acid method as described for the previous preparation, giving 101 gr. of yellow-red oil. Complex content was found to be 40% by infrared analysis.

EXAMPLE 9

Purification of a tung oil-iron tricarbonyl complex by liquid partition chromatography The column was prepared from 50 gr. silica, 100 ml. light petroleum ether equilibrated with acetonitrile and 20 ml. of acetonitrile equilibrated with petroleum ether: Acetonitrile-treated silica gel as the stationary phase and petroleum ether as the mobile phase. 0.158 gr. of sample were used containing 77.5% of iron tricarbonyl complex of tung oil.

TABLE 3

| Fraction No.: | Volume of each fraction (ml). | Color | Weight of each fraction (mgr.) |
|---|---|---|---|
| 1 | 130 | Clear | 7.5 |
| 2 | 10 | Yellow | 3.0 |
| 3 | 10 | do | 5.4 |
| 4 | 10 | do | 5.3 |
| 5 | 10 | do | 4.1 |
| 6 | 10 | do | 2.1 |
| 7 | 10 | do | 2.0 |
| 8 | 10 | do | 1.7 |
| 9 | 10 | do | 2.0 |
| 10 | 10 | do | 2.0 |
| 11 | 10 | do | 5.8 |
| 12 | 10 | do | 6.9 |
| 13 | 10 | do | 9.5 |
| 14 | 10 | do | 9.2 |
| 15 | 10 | do | 9.7 |
| 16 | 10 | do | 9.0 |
| 17 | 10 | do | 6.5 |
| 18 | 10 | do | 7.9 |
| 19 | 10 | do | 6.1 |
| 20 | 10 | do | 5.1 |
| 21 | 10 | do | 5.9 |
| 22 | 10 | do | 4.7 |
| 23 | 10 | do | 5.3 |
| Total wt. collected | | | 119.8 |

Fractions corresponding to the first and the second band were combined, respectively. Combined fractions 3–7 were analyzed by infrared giving 76% of tung oil iron tricarbonyl complex.

Combined 11–19 fractions, analyzed in a similar way resulted in 97% complex.

EXAMPLE 10

Preparation of methylated tung oil complex by reaction with Fe$_2$(CO)$_9$ (a) Transesterification of tung oil triglyceride esters: Tung oil (6 gr.) was refluxed in 0.2 N methanolic solution of KOCH$_3$ during 20 minutes. The reaction mixture was cooled and acidified with dilute NCl. The methanol was partly evaporated and the organic material extracted with light petroleum ether. The organic layer was washed three times with water and dried over Na$_2$SO$_4$. The solvent was evaporated, giving a light yellow oil.

The composition of tung oil methyl esters was determined by gas-liquid chromatography analysis.

Gas-liquid chromatography conditions: 15% D.E.G.S. (on Chromosorb W in a 6' x ¼" glass column).

Temperatures:

| | Degrees |
|---|---|
| Column | 190 |
| Detector | 225 |
| Inlet | 240 |
| Outlet | 240 |

N$_2$ flow: 60 ml./min.

TABLE 4

Percent composition of tung oil methyl esters

| | |
|---|---|
| (1) Palmitate | 3.56 |
| (2) Stearate | 3.31 |
| (3) Oleate | 6.29 |
| (4) Linoleate | 7.20 |
| (5) Conj. dienetriene | 2.74 |
| (6) α-Eleostearate | 53.6 |
| (7) β-Eleostearate | 23.6 |

(b) Complexation by reaction with Fe$_2$(CO)$_9$: 3.38 gr. of methylated tung oil (0.0116 mole) and 8.44 gr. of Fe$_2$(CO)$_9$ (0.0232 mole) were heated in petroleum ether to 55–60°. After 20 hrs. 8.8 gr. of Fe$_2$(CO)$_9$ were added and the reaction was continued for another 5 hrs. Then the solids were filtered and the solvent evaporated, leaving a yellow green oil. The crude product contained 87.4% complex (I.R.).

In order to remove the green color methylated tung oil complex was passed through silica gel. First, 50 gr. silica were washed with petroleum ether which removed the green color, then with ethyl ether to extract the complex. Crude, yellow methyl-tung oil complex was received and was shown by infrared analysis to contain 88–91% complex.

Although in the foregoing examples only the complexation of methyl eleostearate and of tung oil, i.e., glycerol esters of eleostearic acid is described, it is obvious that by following analogous procedures iron tricarbonyl complexes of other esters of eleostearic acid can be obtained.

EXAMPLE 11

Testing of drying properties

Drying properties of tung oil compositions containing 38.8%, 40% and 52% by weight of complexed tung oil, were compared with the drying properties of the original non-complexed tung oil by preparing thin oil films on glass plates. The complexed compositions all dried within two to four hours forming yellow, transparent films. Against this, the non-complexed tung oil dried slowly forming a white opaque film.

Having now particularly described and ascertained the nature of our said invention and in what manner the same is to be performed, we declare that what we claim is:

1. Iron tricarbonyl complexes of eleostearic acid esters corresponding to the formula CH$_3$(CH$_2$)$_3$—CH=CH—CH=CH—CH=CH—
(CH$_2$)$_7$CO Alc.Fe(CO)$_3$ in which Alc is a member of the group consisting of glyceryl and methyl.

2. Methyl eleostearate iron tricarbonyl.
3. A tung oil-iron tricarbonyl complex.
4. A methylated tung oil-iron tricarbonyl complex.
5. A tung oil composition of improved drying properties comprising tung oil having added thereto an effective amount of a complex as defined in claim 1.

6. The method of stabilizing methyl β-eleostearate against air-oxidation which comprises reacting methyl β-eleostearate with a member of the group consisting of iron pentacarbonyl and diiron enneacarbonyl to form the methyl β-eleostearate-iron tricarbonyl complex.

References Cited
UNITED STATES PATENTS

| | | | |
|---|---|---|---|
| 3,126,401 | 3/1964 | Ecke | 260—439 |
| 3,373,175 | 3/1968 | Frankel | 260—405.6 |
| 3,392,177 | 7/1968 | Frankel | 260—405.6 |

OTHER REFERENCES

Noller: Chemistry of Organic Compounds, 3rd ed. (1965), pp. 209–210.

LEWIS GOTTS, Primary Examiner

D. G. RIVERS, Assistant Examiner

U.S. Cl. X.R.

106—310; 260—410.7, 410.9R